United States Patent [19]

McHenry

[11] Patent Number: 4,901,080
[45] Date of Patent: * Feb. 13, 1990

[54] RADAR TEST DEVICE WITH PLANAR REFLECTING SHIELD

[75] Inventor: Mark A. McHenry, Stanford, Calif.

[73] Assignee: Northrop Corporation, Hawthorne, Calif.

[*] Notice: The portion of the term of this patent subsequent to Nov. 7, 2006 has been disclaimed.

[21] Appl. No.: 215,680

[22] Filed: Jul. 6, 1988

[51] Int. Cl.$^4$ .............................................. G01S 7/40
[52] U.S. Cl. ............................................. 342/1; 342/4
[58] Field of Search ...................... 342/1, 2, 4, 5, 165, 342/169, 175; 434/2

[56] References Cited

U.S. PATENT DOCUMENTS

| | | | |
|---|---|---|---|
| 3,018,566 | 1/1962 | Krueger | 434/2 |
| 3,216,014 | 11/1965 | Kerr | 342/171 |
| 3,273,150 | 9/1966 | Emerson | 342/4 |
| 3,842,418 | 10/1974 | Lorber | 342/200 |
| 4,019,699 | 4/1977 | Wintersdorff et al. | 342/2 X |
| 4,106,345 | 8/1978 | Saunders | 342/170 |
| 4,345,254 | 8/1982 | Skomal | 342/5 |
| 4,415,898 | 11/1983 | Gaunaurd | 342/192 |
| 4,521,780 | 6/1985 | Preikschat | 342/170 |
| 4,713,667 | 12/1987 | Poirer et al. | 342/192 |
| 4,809,003 | 2/1989 | Dominek et al. | 342/165 |

FOREIGN PATENT DOCUMENTS 2929814 1/1981 Fed. Rep. of Germany.

OTHER PUBLICATIONS

J. F. Hunka et al., "A Technique for the Rapid Measurement of Bistatic Radar Cross Sections", IEEE Transaction on Antenna and Proagation, vol. AP-25, No. 2, pp. 243–248, Mar., 1977.

L. A. Cram et al., "Development of Model Radar Systems Between 30 and 900 GHz", The Radio and Electronic Engineer, vol. 49, No. 7/8, pp. 381–388, Jul.-/Aug., 1979.

Primary Examiner—Thomas H. Tarcza
Assistant Examiner—Gilberto Barrón, Jr.
Attorney, Agent, or Firm—Terry J. Anderson; Robert B. Block

[57] ABSTRACT

A test subject is mounted in front of a radar antenna for measurement of a radar cross-sectional signature of the test subject. The test subject is mounted on an electrically conductive rotator mounted coplanar with an electrically conductive shield, there being a clearance space between the rotator and the shield to allow for rotation of the rotator. An electrically conductive seal is disposed in a shelf of the front surface of the shield in the manner of a fairing to provide a smooth surface of the shield which covers the clearance space for minimizing reflections of radiation, and for deflecting any reflections of radiation from the antenna away from the antenna. A rotator rotates the platform, and a tilt mechanism tilts the shield for variation in elevation angle. The foregoing apparatus is mounted within an anechoic chamber.

8 Claims, 2 Drawing Sheets

RADAR TEST DEVICE WITH PLANAR REFLECTING SHIELD

BACKGROUND OF THE INVENTION

This invention relates to the measurement of radar target cross section of a test subject in conjunction with a ground plane and, more particularly, to the provision of a rotatable test subject in conjunction with a ground plane in an environment which inhibits unwanted reflections from a test environment back towards a radar antenna employed in conducting the test.

In the measurement of radar cross section, it is common practice to employ a test fixture of low radar cross section upon which the subject with its unknown radar cross section is mounted. By measuring the combined radar cross section, the subject's radar cross section in conjunction with a ground plane can be determined. Often, a test fixture and subject may be rotated during a measurement procedure to obtain cross-sectional data as a function of subject orientation relative to a radar antenna.

A problem arises in the use of test fixtures which support a subject in front of a radar antenna in that a test fixture may also reflect radar transmissions back toward the radar antenna. Extraneous reflections are exacerbated in a situation in which a test fixture rotates with a rotating subject because the rotation increases the difficulty of separating subject reflections from reflections from the test fixture. Reflections emanating from the test fixture tend to mask reflections from the test subject and, thereby, reduce the accuracy of data provided by measurements of the test subject.

A second problem with test fixtures is that the minimum spacing between the radar and the fixture depends on the size of the fixture. The commonly accepted minimum spacing is given by $$s = \frac{2 D^2}{\lambda}$$

where D is the size of the fixture and lambda is the radar wavelength. In typical applications, s can be very large. This large separation forces tests to be conducted outdoors or in very large specially constructed test chambers. Both test implementations are very expensive.

SUMMARY OF THE INVENTION

The foregoing problems are overcome and other advantages are provided by a test fixture, constructed in accordance with the invention, for rotatably supporting a radar test subject in front of a radar antenna during measurement of radar and/or test subject parameters. In accordance with a feature of the invention, the test fixture is mounted within an anechoic chamber to prevent reflections from any subject matter in the vicinity of the test fixture and the test subject. The test subject is mounted on a planar reflecting shield in the form of a rigid plate which may be tilted relative to the direction of a beam of radiation transmitted from a radar antenna.

The shield has a front surface which is angled relative to the direction of propagation of a beam of radiation transmitted from the radar antenna so as to deflect any radiation echoes, emanating from the shield, away from a return path toward the antenna. A rotatable supporting platform is disposed within the test fixture. A mechanism for rotating the platform is disposed behind the platform, and is hidden from view of the antenna by the shield. The test subject is carried by the platform, and protrudes through an opening in the shield so as to be illuminated by radiation from the antenna. Thereby, the shield prevents illumination of the mechanism employed in rotating the platform.

It is recognized that a boundary, or edge, at an interface between the shield opening and the rotatable platform may also serve as a source of reflection of the radiation. Such reflection, in accordance with a further feature of the invention, is substantially eliminated by the construction of a seal of thin foil of opaque material which partially encloses the opening so as to cover the interfacing edges of shield and platform. A thin metallic foil which reflects radiation is employed in the preferred embodiment of the invention. The foil is much thinner than a quarter-wavelength of the radiation so as to offer virtually no reflecting cross section to any exposed edge of the foil. The foil boundary is also straight and makes an oblique angle with the incoming radar wave to deflect any remaining energy away from the radar.

The foregoing construction permits a test subject to be viewed by a radar during rotation of the subject without introduction of any significant radiation from the test device which supports the test subject.

BRIEF DESCRIPTION OF THE DRAWING

The aforementioned aspects and other features of the invention are explained in the following description, taken in connection with the accompanying drawing wherein.

DETAILED DESCRIPTION

Figure 1:
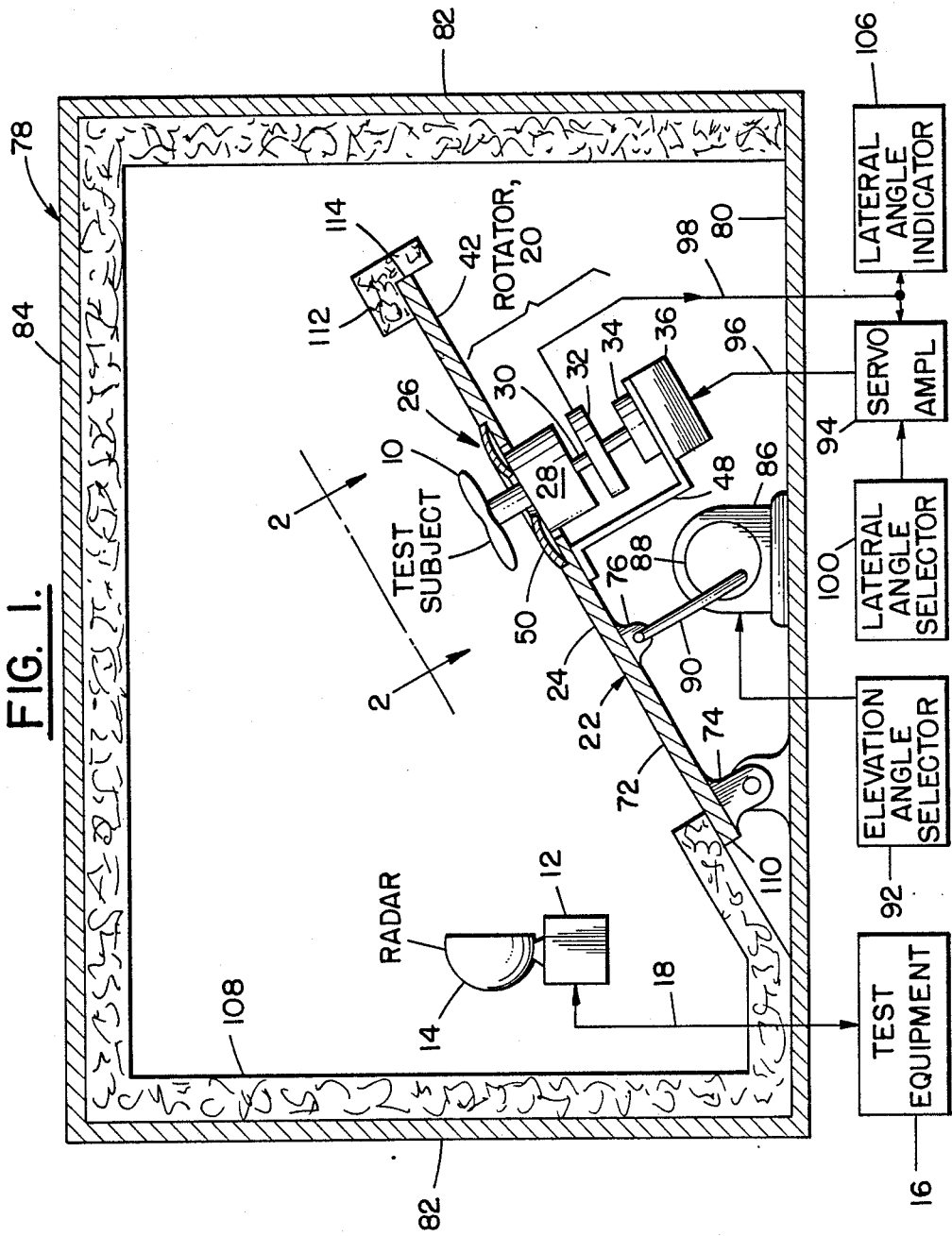
FIG. 1 is an elevation sectional view of the test device of the invention with a test subject supported thereon for illumination by a radar, portions of the view being indicated diagrammatically.

FIG. 1 shows a test subject 10 positioned in front of a radar set 12 which includes a well-known transmitter and receiver (not shown) of radar signals. A radar antenna 14 is disposed on top of the set 12 for directing a beam of radiation carrying a radar signal to the subject 10, and for receiving a radar signal from the subject 10. Test equipment 16 is connected via line 18 to the radar set 12 for outputting data, such as signal strength and spectral components of echoes reflected from the subject 10 to the antenna 14.

In accordance with a feature of the invention, the subject 10 is supported by a rotator 20 disposed behind a shield 22 of electrically conductive material, such as copper or aluminum, which shields the rotator 20 from radiation, incident upon the shield 22, from the antenna 14. The shield 22 has a smooth front surface 24 which reflects the incident radiation away from the rotator 20, reflected rays of radiation being directed away from the antenna 14. Thereby, there are no echoes from the rotator 20, and echoes from the shield 22 are directed away from the antenna 14 to ensure that measurements of the test subject 10 are free of extraneous reflections of radiation.

The subject 10 protrudes through an opening 26 in the shield 22 to be illuminated by radiation transmitted by the antenna 14. Therefore, only echoes of radiant energy radiating from the subject 10 in conjunction with a ground plane are received at the antenna 14 to enable accurate measurement of radiation signature of the subject 10. Rotation of the subject 10 by the rotator 20 permits subject signature to be measured as a function of angle about an axis of the rotation.

Figure 2:
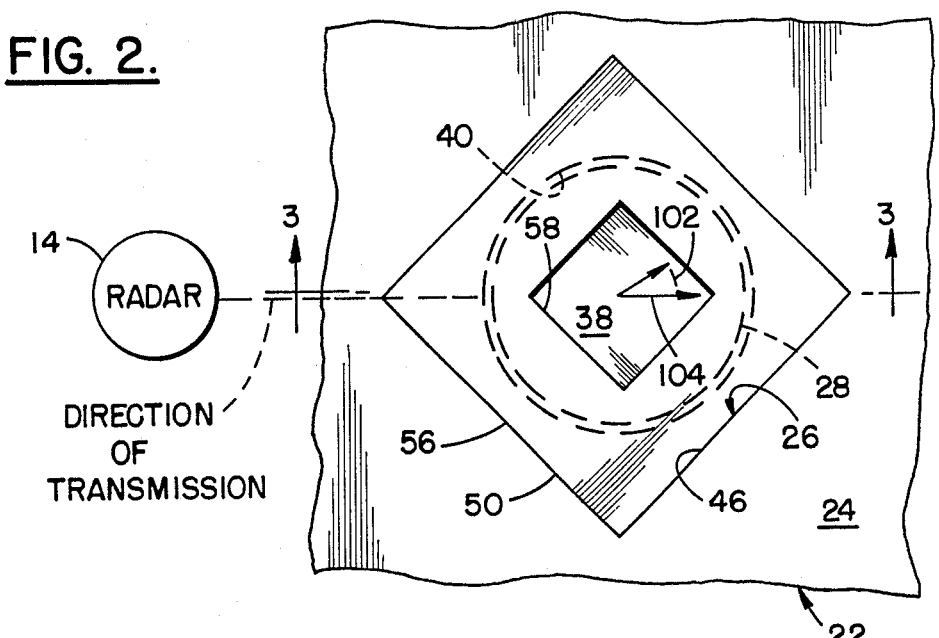
FIG. 2 is an enlarged fragmentary plan view of the test device taken along a line 2—2 in FIG. 1.
Figure 3:
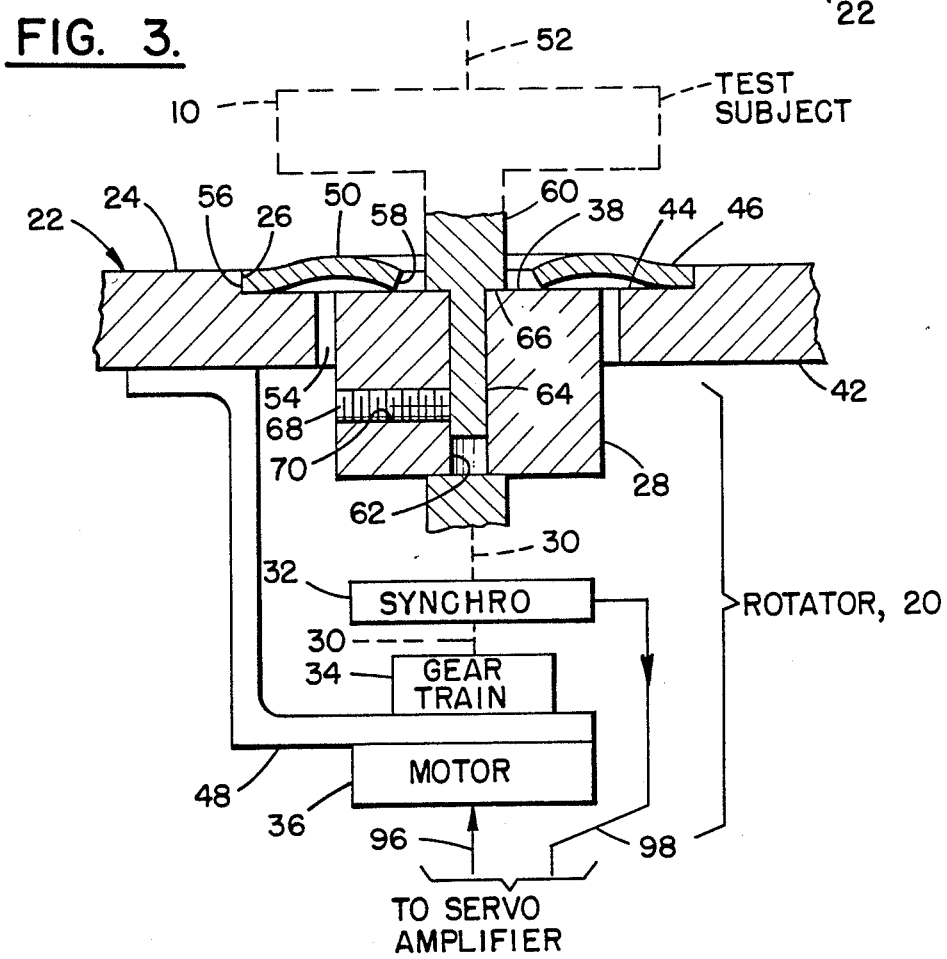
FIG. 3 is a sectional view of a rotator of the test device taken along a line 3—3 in FIG. 2.

With reference also to FIGS. 2 and 3, the rotator 20 comprises a circular turntable 28 connected by a shaft 30 to a synchro 32 and a gear train 34. A motor 36 drives the turntable 28 via the gear train 34 to impart a desired rotation to the turntable 28. A top surface 38 of the turntable 28 fits into the opening 26 of the shield 22. In FIG. 2, the test subject 10 has been deleted, and in FIG. 3 the test subject 10 is shown in phantom for clarity.

The opening 26 comprises a circular cylindrical passage 40 which extends from a back surface 42 of the shield 22 almost to the front surface 24, and then expands radially outward into a shelf or recess 44. The shelf 44 is bounded by sidewalls 46 arranged in the form of a diamond, as viewed from the front surface 24. The top surface 38 of the turntable 28 is aligned in the same plane with the shelf 44. A brace 48 extends from the back surface 42 of the shield 22 to the motor 36 and gear train 34 to position the rotator 20 relative to the shield 22 and to hold the turntable 28 within the passage 40.

In accordance with a feature of the invention, the radiation seal 50 is disposed within the shelf 44, and extends inwardly from the sidewalls 46 towards the central axis 52 of the rotator to close off a portion of the opening 26. The seal 50 is formed of radiation opaque material, preferably metal foil, and extends over a clearance space 54 between the turntable 28 and the passage 40. The space 54 provides sufficient clearance to allow rotation of the turntable 28 relative to the fixedly mounted seal 50. The thickness of the seal 50 is equal to the depth of the recess 44, i.e., the height of the sidewalls 46. An outer boundary 56 of the seal 50 conforms to the diamond-shaped configuration of the sidewalls 46 so as to permit insertion and retention of the seal 50 into the shelf 44 by a press fit. An inner boundary 58 of the seal 50 is large enough to clear the test subject 10 on the turntable 28. A slight bowing of the seal 50 urges the inner boundary 58 to contact the top surface 38 of the turntable 28, in a manner which may be described as spring loaded and to rub against the top surface 38 during rotation of the turntable 28.

The configuration of the seal 50 enables the seal to serve as a continuation of the front surface 24 of the shield 22 in the manner of a fairing past the clearance space 54. By constructing the seal 50 of a resilient foil, the inner boundary 58 of the seal can track any displacement of the turntable 28 along a direction of the axis 52 to accommodate any manufacturing tolerances in the construction of the brace 48 and in the positioning of the turntable 28.

As shown in FIG. 2, the orientation of each of the sidewalls 46 is angled relative to a direction of transmission of radar signals from the radar antenna 14 so that any reflections which might develop at the interface between the front surface 24 of the shield 22 and the outer boundary 56 of the seal 50 are directed away from the radar antenna 14. Furthermore, the equalization of the thickness of the seal 50 to the height of the sidewalls 46 and hence, to the depth of the shelf 44, in combination with the tight fit of the seal 50 and the sidewalls 46 militates against the development of reflections of any significant amount of radiation from the interface between the seal 50 and the shield 22. In a preferred embodiment of the invention, the thickness of the seal 50 is substantially less than one-quarter wavelength of the radiation from the antenna 14 so as to introduce no more than an insignificant reflection from the inner boundary 58 of the seal 50, it being noted that the inner boundary 58 is exposed to incident radiation in the vicinity of the test subject 10. The covering of the edges of the turntable 28 and the shelf 44 at the clearance space 54 by the seal 50 prevents incident radiation from reaching these edges so as to prevent the generation of any echoes of radiation from these edges. The turntable 28 is also fabricated of electrically conducting material, such as copper or aluminum, so as to coact with the seal 50 and the shield 22 in shielding the rotator 20, and in forming an electrical ground plane upon which the test subject 10 is mounted.

By way of example, the test subject 10 may be an aircraft antenna, positioned above the turntable 28 and shield 22 to simulate an installation of the antenna above an aircraft skin. By way of example in securing the subject 10 to the turntable 28, the turntable 28 is provided with a central bore 62 which receives a spindle 64 extending downwardly from an end of the shaft 60. The spindle 64 and the bore 62 have essentially the same diameter, apart from a small clearance which facilitates insertion of the spindle 64 into the bore 62, the diameter being smaller than the diameter of the shaft 60 to create a circular shelf 66 by which the shaft 60 rests upon the top surface 38 of the turntable 28. A set screw 68 extends sidewise through a threaded bore 70 of the turntable 28 to contact the spindle 64 and to lock the subject 10 in position on the turntable 28. Test of flush mounted components such as aircraft lights would be accomplished by machining the turntable 28 to accept the light in the same manner as the light would be installed in an aircraft skin.

FIG. 1 shows a further feature of the invention, namely, the capacity to tilt the shield 22 so as to vary the angle of elevation of the test subject 10 relative to the radar antenna 14. The capacity for tilting the shield 22 is accomplished by constructing the shield 22 as a rigid plate 72 having two hinges 74 and 76 extending outwardly from the back surface 42. The shield 22, the subject 10, the rotator 20 and the radar set 12 with antenna 14 are mounted within a metallic enclosure 78 having a floor 80, sidewalls 82 upstanding from the floor 80, and a roof 84 supported by the sidewalls 82. The hinge 74 connects a lower end of the flat plate 72 to the floor 80 so as to provide a pivoting of the plate 72 relative to the floor 80. A motor 86 is supported by the floor 80 and has an output crank 88 connected pivotally by a rod 90 to the hinge 76. Operation of the motor 86 rotates the crank 88 to raise or lower the hinge 76, and thereby tilt the plate 72 about the hinge 74. The tilt motor 86 is operated by well-known electronic circuitry, shown in FIG. 1 as a tilt angle selector 92, which includes a manually operated input device by which a person can activate the motor 86 to rotate clockwise or counterclockwise to provide a desired elevation angle to the shield 22.

Control of rotation of the motor 36 for rotating the test subject 10 is accomplished by means of a servo amplifier 94 which outputs a motor drive signal via line 96 and receives a feedback signal from the synchro 32 via line 98. An input signal to the amplifier 94 is provided by an angle selector 100, which may be a well-known manually-operated analog or digital encoder, for directing rotation of the motor 36 to provide rotation of the test subject 10 to a desired lateral angle 102 (FIG. 2). The lateral angle 102 is measured relative to an axis 104 lying in a plane of the front surface 24, the axis 104 being perpendicular to a pivot axis of the hinge 74. The synchro 32 outputs the lateral angle as an electric signal via line 98 to the synchro amplifier 94 and also to an indicator 106 of the lateral angle. The amplifier 94 operates in well-known fashion to form the difference between a requested lateral angle, at the selector 100, and the actual lateral angle, as outputted by the syncro 32 to develop the motor drive signal on line 96, thereby to drive the subject 10 to the desired lateral angle. Use of the tilt motor 86 and the rotator motor 36 enables the test subject 10 to be illuminated at numerous angles of illumination so as to provide signature data as a function of many angles of illumination, each illumination angle having a lateral component, selected by the selector 100, and an elevation component by the elevation angle selector 92.

In operation, the metallic enclosure 78 isolates measurement of signature of the subject 10 from any sources of radiation outside of the test environment within the enclosure 78. In order to insure that there are no spurious reflections from the metallic walls of the enclosure 78, all portions of the interior of the enclosure 78 within view of the radar antenna 14 are covered with radiation absorptive material in the form of a liner 108, the liner 108 covering the sidewalls 82, the roof 84, and a portion of the floor 80. In addition, the liner extends from the floor 80 to cover a front edge 110 of the plate 72 to prevent reflections from the edge 110. Rays of radiation reflected from the shield 22 are absorbed by the liner 108. A covering 112 of the radiation absorptive material is applied to a distant edge 114 of the plate 72 to prevent the generation of radiation reflections from the edge 114. The test equipment 16 is mounted outside of the enclosure 78, the line 18 connecting the test equipment 16 with the radar set 12 passing through an aperture (not shown) in the lining 108 and the floor 80. Similarly, the lines 96 and 98 pass through the floor 80 to permit location of the servo amplifier 94 outside of the enclosure 78. Also, the angle selectors 92 and 100 as well as the indicator 106 are located outside of the enclosure 78 so as to provide convenience in the use of the invention.

The minimum distance s between the radar 14 and the test subject is determined by the commonly accepted formula $$s = \frac{2D^2}{\lambda}$$

where lambda is the radar wavelength and D is the size of the test subject 10. In other radar cross section measurement methods, D would be the size of the test fixture which is much larger than the test subject 10. Because of the smaller D in the new method of the invention, the minimum distance s is greatly reduced which allows testing to be conducted in substantially smaller test chambers.

The invention is particularly useful in the measurement of radar cross section of test subjects having very small reflection coefficients. The construction of the metallic enclosure 78 with the radiation absorptive liner 108 serves as an anechoic chamber which, in combination with the inclined attitude of the shield 22 relative to the propagation direction of radiation from the antenna 14, essentially removes all reflected radiation except that emanating from the test subject so as to enable the measurement of signature of subjects having a very low radar cross section. It is advantageous to employ a pulse radar which can gate out radar returns from a wall of the enclosure 78, as well as echoes which might emanate from the front edge 110 of the plate 72 or back covering 112. Calibration of signatures of a test subject in detail can be accomplished by use of a source of reflected radiation such as a circular plate (not shown) installed at the site of the subject 10, which circular plate would have a defect of known radar cross sections such as a round hole.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. Radar test apparatus for examining a test subject to be illuminated by a beam of radiation from a radar set including an antenna for emitting and receiving a radar beam into and from a path extending in a predetermined direction, comprising:

a rotator for supporting said test subject and including platform means for mounting the test subject for rotation in the path of said beam together with a conductive turntable mounted below said test subject, a shield positioned behind the test subject on the side away from the radar antenna, said shield being inclined at an angle to the direction of said beam for reflecting those portions of the radar beam which pass the test subject out of the received path seen by the antenna, said shield having an opening therein surrounding said shaft and turntable, means forming a seal between the turntable and the shield and including a recess having a diamond shaped outer periphery formed in the shield and a thickness substantially less than one-quarter wavelength of the radar beam, said recess having a plurality of edges formed in the shield and generally configured-oriented so that no edge is reflective into the receive path of said antenna, and a foil having a peripheral shape complementary to said recess for closely fitting in the outer periphery of said recess and in making relation to the shield in the manner of a fairing to provide a continuous smooth transition therebetween essentially free from generation of reflections, and further having an inner shape for lying in touching engagement onto the upper surface of said turntable.

2. In radar test apparatus, a device for supporting a radar test subject to be illuminated by a beam of radiation from a radar antenna comprising:

rotatable means for supporting the test subject, said means including a conductive surface located beneath the subject, a shield of electrically conductive material extending outwardly from the surface to surround the subject on the side away from the radar bean, the shield being inclined relative to the path of said beam to said subject, said shield having a passage therethrough surrounding said surface, said passage being bounded on the subject side by a recess, a radiation opaque seal extending from the recess in the shield to bridge the gap between the shield and the surface, the seal having a thickness the same as the depth of said recess so that the front surface of the seal mates fair with the front surface of the shield to provide a substantially continuous smooth surface essentially free from generation of reflections of radiation thereat.

3. A radar test device according to claim 2 further comprising an enclosure enclosing said antenna and said shield and said test subject, said enclosure having radiation absorptive material for preventing the generation of spurious reflections in a direction towards the antenna during a measurement of radar cross section of the test subject.

4. A test device according to claim 2 wherein said seal interfaces with said shield at mating edges which are inclined relative to a general direction of propagation of radiation from the antenna.

5. A test device according to claim 2 further comprising a rotator disposed behind said shield for rotating said platform means said subject extending from said platform means forward of said shield to be illuminated by said radiation, said rotator being shielded from said radiation by said shield.

6. A test device according to claim 2 further comprising means for tilting said shield with said platform means and said test subject, thereby to vary an angle of elevation of said test subject relative to said antenna.

7. A test device according to claim 6 further comprising a rotator disposed behind said shield for rotating said platform means said subject extending from said platform means forward of said shield to be illuminated by said radiation, said rotator being shielded from said radiation by said shield; and wherein rotation of said platform by said rotator provides rotation through a lateral angle in a plane parallel to a front surface of said shield, a front surface of said shield being flat, and wherein said seal is spring-loaded and has an inner boundary which contacts a front surface of said rotator, the front surface of said rotator being electrically conducting.

8. A test device according to claim 7 further comprising an enclosure enclosing said antenna and said shield and said test subject, said enclosure having radiation absorptive material for preventing the generation of spurious reflections in a direction towards the antenna during a measurement of radar cross section of the test subject; and wherein said seal interfaces with said shield at edges which are inclined relative to a general direction of propagation of radiation from the antenna.

* * * * *